United States Patent [19]

Moriya

[11] 3,966,342
[45] June 29, 1976

[54] INTERIOR STRUCTURE FRAME ASSEMBLY

[75] Inventor: Mamoru Moriya, Tokyo, Japan

[73] Assignee: Seiki Hanbai Co., Ltd., Tokyo, Japan

[22] Filed: Oct. 25, 1974

[21] Appl. No.: 517,931

[52] U.S. Cl. .................................. 403/405; 52/645; 52/665; 52/690; 52/758 C; 403/297
[51] Int. Cl.² ........................ E04C 2/42; B25G 3/00
[58] Field of Search ......... 52/665, 690, 645, 758 H, 52/475, 656, 758 C; 403/297, 231, 297, 169–178, 405–410

[56] References Cited
UNITED STATES PATENTS

| | | | |
|---|---|---|---|
| 3,371,454 | 3/1968 | Anderson | 52/665 |
| 3,574,367 | 4/1971 | Jankowski | 403/297 |
| 3,749,432 | 7/1973 | Janssen | 52/665 |
| 3,778,175 | 12/1973 | Zimmer | 52/645 |

Primary Examiner—Ernest R. Purser
Assistant Examiner—James L. Ridgill, Jr.
Attorney, Agent, or Firm—Hammond & Littell

[57] ABSTRACT

An interior structure frame assembly which comprises at least two identical upright pillars disposed in opposite and spaced relationship to each other each having a plurality of vertical openings in its outer periphery extending the length of the associated pillar, at least one transverse beam member extending transversely between and detachably secured at the opposite ends to said pillars and at least two elastic beam holder units received within said beam member in the opposite end portions of the beam member for detachably securing the opposite ends of said beam member to said pillars.

3 Claims, 7 Drawing Figures

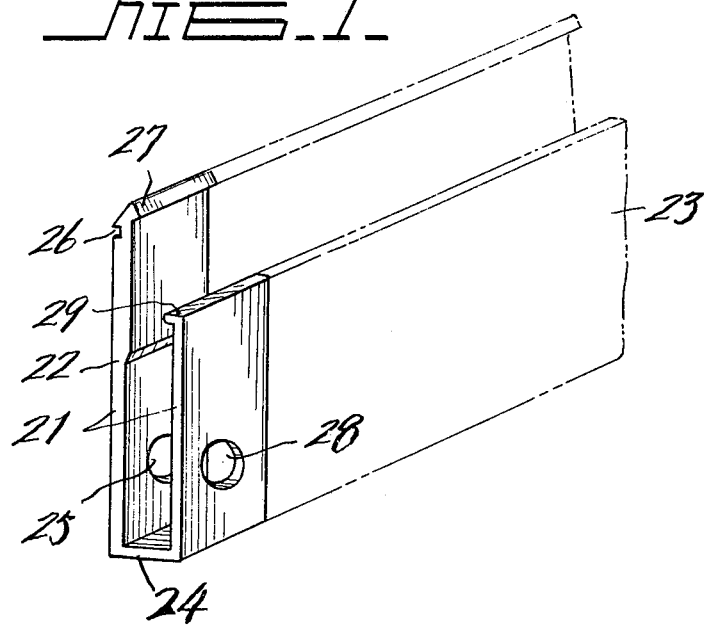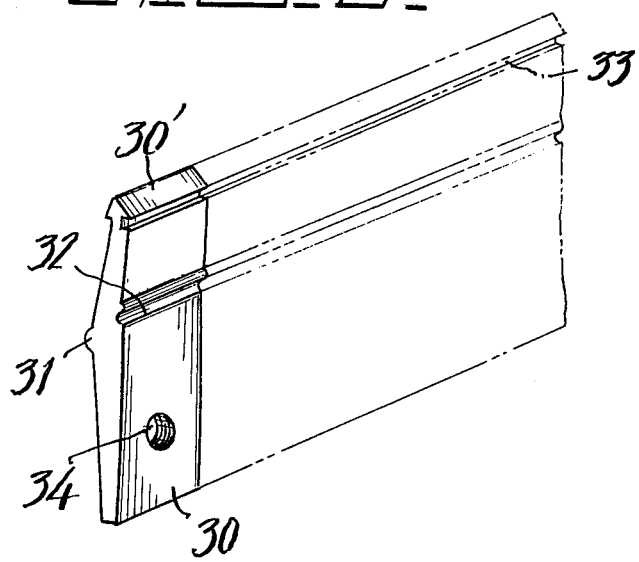

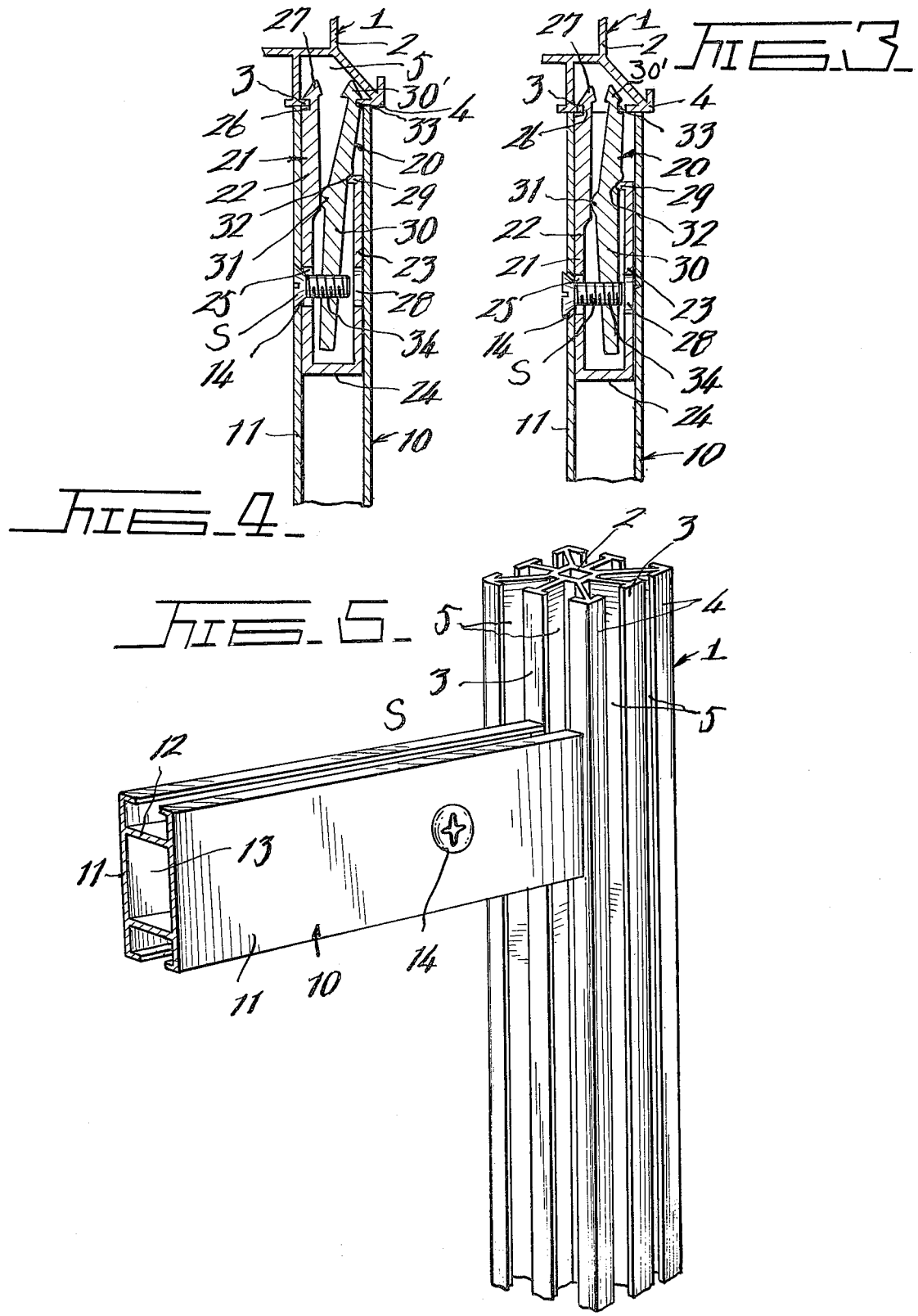

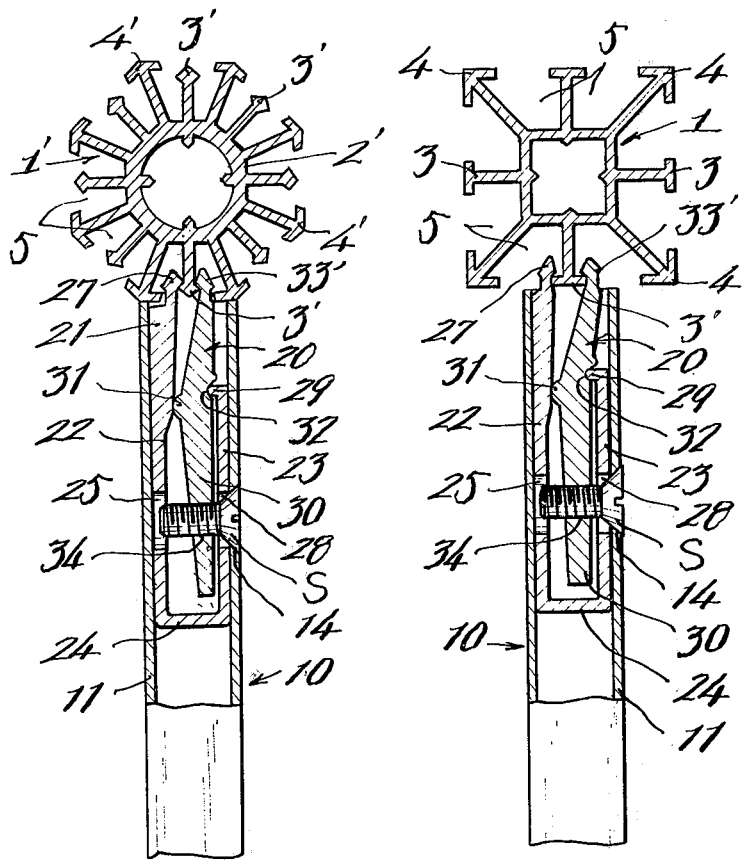

INTERIOR STRUCTURE FRAME ASSEMBLY

BACKGROUND OF THE INVENTION

This invention relates to an interior structure frame assembly and more particularly, to an interior structure frame assembly which comprises at least two opposite and spaced identical upright pillars, at least one transverse beam member extending transversely between and detachably secured to the pillars at the opposite ends of the beam member and at least two beam holder units received in the opposite end portions of the beam member for detachably securing the opposite ends of the beam member to the pillars. More particularly, the present invention relates to a beam holder unit adapted to detachably secure a transverse beam member at the opposite ends thereof to opposite and spaced upright pillars each having a plurality of openings in its outer periphery.

There have been proposed and practically employed a variety of beam holder units which are adapted to secure a beam or rail to opposite and spaced upright pillars to thereby fabricate an interior structure frame assembly. Each of the conventional beam holders of the above type comprises a pair of right and left half portions. However, after the half portions have been separately formed, such half portions of the beam holder have to be further processed to drill holes therein, for example, to receive suitable support means such as a support shaft and then connected together by the support shaft with a spring and the like interposed disposed on the shaft and between the holder half portions. Therefore, the conventional holder has to be individually formed by the separately formed half portions requiring additional parts and a complicated fabrication procedure which inevitably result in increase in production cost of such a holder. Thus, the conventional holders of the above type are disadvantageous from the economical point of view. Furthermore, the conventional holders of the above type have also the disadvantage that the components of the holders have to be customized depending upon particular load carrying requirements and assembled requiring particular procedures necessary for such particular load carrying requirements.

SUMMARY OF THE INVENTION

Therefore, one object of the present invention is to provide a novel and improved interior structure frame assembly which can effectively eliminate the disadvantages inherent in the conventional interior frame assemblies referred to above.

Another particular object of the present invention is to provide a novel and improved beam holder unit which can be fabricated by merely assemblying a pair of half portions of the holder unit by the use of a single screw in such a manner that one of the half portions can be moved toward and away from the other half portion while eliminating any complicated fabrication procedure.

A further object of the present invention is to provide an interior structure frame assembly which can be employed under various load conditions only by the increase or reduction of the number of its standard molded components without requiring any modification of the components to meet the different load conditions.

The interior structure frame assemblies of the invention find their applications as the frameworks for porch curtains, room partitions, mirror mounts in toilet rooms, small article mounts, in bath rooms, shelves curtain rails and the like interior structures, for example.

The above and other objects and attendant advantages of the invention will be more apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 1 is a fragmentary perspective view which shows a portion of the first holding member of a beam holder unit used in a first embodiment of interior structure frame assembly constructed in accordance with the present invention;

FIG. 2 is a fragmentary perspective view which shows a portion of the second holding member of the beam holder unit of the first embodiment of interior structure frame assembly;

FIG. 3 is a fragmentary cross-sectional view on a reduced scale showing the beam holder unit in its released position with respect to a pillar;

FIG. 4 is similar to FIG. 3, but shows the beam holder unit in its engaged tightened or position with respect to the pillar;

FIG. 5 is a fragmentary perspective view on a reduced scale showing one beam member in its held position on one pillar by the use of said beam holder unit;

FIG. 6 is a fragmentary cross-sectional view of a second embodiment of interior structure frame assembly constructed in accordance with the present invention; and FIG. 7 is a fragmentary cross-sectional view of a third embodiment of interior structure frame assembly constructed in accordance with the present invention.

PREFERRED EMBODIMENTS OF THE INVENTION

The present invention will be now described referring to the accompanying drawings and more particularly, to FIGS. 1 through 4 in which a first embodiment of interior structure frame assembly of the invention is in detail shown. The interior structure frame assembly generally comprises at least two identical upright pillars 1, 1 which are adapted to be positioned in spaced and opposite relationship to each other, at least one transverse beam member 10 extending horizontally between the opposite pillars 1, 1 and adapted to be detachably connected at the opposite ends to the pillars and at least two identical elastic beam holder units 20, 20 received in the opposite end portions of the beam member 10 for detachably securing the opposite ends of the beam member to the pillars 1, 1. Each beam holder unit 20 is received in one end portion of the beam member 1. In the illustrated embodiment, the pillar 1 has a substantially square cross-section and includes a center hollow core 2 of square cross-section which extends in the length of the pillar 1 and a plurality of projections extending outwardly from the square center core 2. The projections include four projections 3 of T-shaped cross-section each extending outwardly from one side of the square center core 2 and also in the length of the pillar and four projections 4 of arrow-shaped cross-section each extending outwardly from each corner of the square center core 2 and also in the length of the pillar. Each of the T-shaped projections 3 cooperates with the adjacent one of the arrow-shaped projections 4 to define an opening 5 of trapezoid cross-section therebetween and the inner side of the opening 5 is defined by the adjacent one side of the square center core 2 while the outer side of the opening 5 is defined by the heads of the cooperating adjacent T-shaped and arrow-shaped projections 3 and 4 which extend toward and are spaced from each other for the purpose to be described hereinafter.

The beam member 10 is a substantially hollow rectangular integral member and includes a pair of similar upright side walls 11, 11 of substantially U-shaped cross-section with the arms at the upper and lower ends of the side walls extend toward and are spaced from each other and upper and lower spaced transverse portions 12 and 13 which define an opening 13 for receiving beam holder units 20 therein in the manner will be described hereinafter. The side walls 11, 11 are provided with aligned through holes 14 for selectively receiving the head of a screw in the manner as will be described hereinafter (the hole 14 in only one side wall 11 is shown in FIGS. 3 and 4).

Each of the beam holder units 20 which is formed of an elastic light material such as aluminum is adapted to be received in each end portion of the opening 13 in the beam member 10 as shown in FIGS. 3 and 4 and comprises a first holding member 21 of substantially U-shaped cross-section and a second holding member 30 of substantially angular cross-section.

As more clearly shown in FIG. 1, the first beam holding member 21 includes a longer leg 22 and a shorter leg 23 which are connected together at their inner ends by an intermediate portion 24. The inner side of the longer leg 22 is undercut in the portion adjacent to the inner end thereof for the purpose to be described hereinafter and a hole 25 having the same diameter as and in alignment with the hole 14 in one side wall 11 of the beam member 10. The outer side of the upper portion of the longer leg 22 is provided with a recess 26 which is adapted to fit on the head of the adjacent one T-shaped projection 3. The outer end of the longer leg 21 is pointed as shown at 27 and adapted to enter the opening 5 defined by a pair of cooperating T-shaped and arrow-shaped projections 3 and 4 when the beam member 10 is to be secured to the adjacent pillar 1. The shorter leg 23 is also provided with a hole 28 having the same diameter as and in alignment with the holes 14 and 25 in the beam member 10 and longer leg 22 and has an engaging pawl 29 extending inwardly from the outer end of the leg for the purpose to be described hereinafter. The width of the first beam holding member 21 is so selected that when the beam holder unit 20 is held in position within the beam member the outer sides of the longer and shorter legs 22 and 23 contact and held in position by the inner sides of the walls 11 and 11, respectively.

The second beam holding member 30 is interposed between the longer and shorter legs of the first beam holding member and has an angular configuration as seen in cross-section so as to form an apex 31 substantially in the center in the longitudinal direction of the inner side of the member and the apex is adapted to serve as the fulcrum when the second beam holding member moves relative to the first beam holding member 20 as will be described hereinafter. The outer side of the second beam holding member 30 is formed with a semicircular recess 32 into which the engaging pawl 29 on the first beam holding member 21 is adapted to engage. The outer side of the second beam holding member 30 is also provided at a point adjacent to the pointed outer end 30' with a recess 33 adapted to fit on the head of the associated one arrow-shaped projection 4 and a threaded hole 34 is also provided in the second beam holding member in alignment with the holes 25 and 28 in the first beam holding member 21 for receiving a screw S. When the beam member 10 is desired to be secured to the pillar 1, first of all, the beam member 10 is positioned in alignment with one selected opening 5 in the pillar 1 and then the screw S is inserted through the holes 14 and 25 in the beam member 10 and first beam holding member 22 and threaded into the threaded hole 34 in the second beam holding member 21. As the screw S is tightened in the manner as mentioned above, the second beam holding member 30 is rotated in the clockwise direction (as seen in FIG. 4) about the apex 31 as the fulcrum. The movement or rotation of the second beam holder 30 in the clockwise direction relative to the first beam holding member 21 is permited by the provision of the undercut in the inner side of the longer leg 22 as described hereinabove. As a result, the recess 33 in the second beam holding member 30 fits on the head of the associated arrow-shaped projection 4 to thereby secure one end of the beam member 10 to the associated pillar 1. When it is desired that the beam member 10 be separated from the pillar 1, the screw S is rotated in the opposite or loosening direction to thereby rotate the second beam holding member 30 in the conter-clockwise direction so as to disengage the recess 33 from the head of the associated arrow-shaped projection 4. Since the beam holder unit 20 for the other end of the beam 10 are idential with those of the beam holder unit 20 for the one end of the beam member in construction and operation, description of the beam holder unit for the other end will be omitted herein.

When the interior structure frame assembly of the invention is to be employed for forming a shelf, for example, four upright pillars 1 are positioned at four corners of a space where the shelf is formed and two spaced front and rear beam members 10 each having two beam holder units 20 positioned in the opposite ends thereof in the manner mentioned hereinabove are suitably positioned with respect to the front pair of pillars and rear pair of pillars, respectively in the same manner as mentioned hereinabove. Thereafter, the beam members are secured to the pillars by means of the beam holder units 20 therein in the manner mentioned hereinabove to form a desired shelf framework. Thereafter, a selected number of shelf boards are arranged on the two parallel beam members 10 transversely of the beam members and then a rear plate is applied on the rear side of the rear beam member 10 to thereby complete the shelf.

Referring to FIG. 6 in which a second embodiment of interior structure frame assembly of the invention is shown. The second embodiment is substantially similar to the first embodiment except for the configuration of the pillar and the insertion direction of the screw and therefore, the parts corresponding to those of the first embodiment are assigned the same numerals as those assigned to the corresponding parts of the first embodiment and description will be made on only the modified parts with primes added to the numerals. In the second embodiment, the pillar 1' has a substantially circular configuration as seen in cross-section and includes a center hollow core 2' of circular cross-section and a plurality of projections extending radially and outwardly from the core. The projections include alternately disposed shorter and longer projections. Each of the shorter projections 3' has the angularly bulged outer end and each of the longer projections 4' has the same shape as the projection 4 in the first embodiment. In this embodiment of FIG. 6, when the beam member 10 is to be secured to the pillar 1', the screw S is inserted through the hole 14 in the right-hand side wall 11 (not the hole 14 in the left hand side wall in the first embodiment) and the hole 28 in the shorter leg 23 of the first beam holding member 21 and threaded into the threaded hole 34 in the second beam holding member to rotate the second beam holding member 30 in the counterclockwise direction about the flucrum 31 so as to cause the recesses 26 and 33 in the first and second beam holding members 30 to snugly fit on the head of the associated projection 3' whereby the beam member 10 is secured at one end to the associated pillar 1'. The other end of the beam member 10 is also secured to the identical opposite pillar 1'.

FIG. 7 shows a third embodiment of interior structure frame assembly of the invention and this embodiment is substantially similar to the first embodiment except for the engaging manner of the first and second beam holding members with respect to the pillar and therefore, the parts of the third embodiment are shown by the same numerals as those used for the corresponding parts of the first embodiment. In the embodiment of FIG. 7, the screw S is inserted through the holes 14 and 34 in the beam member 10 and the first beam holding member 21 and threaded into the threaded hole 34 in the second beam holding member 30 to rotate the second beam member in the counter-clockwise direction so as to cause the outer ends of the first and second beam holding members to snugly engage the head of the associated T-shaped projection 3 to thereby secure the beam member 10 at one end to the associated pillar 1 by means of the beam holder unit 20 in the end of the beam member. The other end of the beam member is similarly secured to the opposite pillar by the beam holder unit associated to the other end of the beam member. Although not shown, it is to be understood that beam members can be secured to a selected number of projections or all of the projections in the pillars depending upon the type of an inner structure frame assembly to be fabricated and that a plurality of beam members can be secured to each of projections at different height along the length of the pillar.

For fabricating a simple interior structure, although not shown, the interior structure frame assembly comprises one upright pillar 1, one hollow transverse beam member 10 adapted to be detachably secured at only one end to the pillar 1 and one beam holder unit 20 received in one end portion of the beam member 10 for detachably secure the pillar 1. This simplified interior structure frame assembly can be assembled in the same manner as the foregoing embodiments and therefore, explanation of the assembling of the simplified embodiment will be omitted herein.

As clear from the foregoing description of preferred embodiments of the invention, according to the present invention, any one of the embodiment can be fabricated with a relatively fewer number of components and in a relatively simpler way as compared with the prior art interior structure frame assemblies which have required a relatively larger number of components and a relatively complicate fabrication procedure. Especially, according to the present invention, labor for forming separate preformed units and additional parts such as support shafts, springs and the like can be eliminated. All the pillars, beam members and beam holding members can be simply formed by injection molding and as to the pillars and beam members, it is only required that the components are cut to a desired length sufficient to support a desired load after the injection molding thereof. Thus, the interior structure frame assemblys of the invention are quite suitable for mass production at less expensive. Furthermore, the components of the interior structure frame assemblys of the invention are quite simple in their assemblying and disassemblying operation and the components can be easily carried to any desired location where the interior structure frame assembly is to be fabricated.

While only several embodiments of the invention has been shown and described in detail, it will be understood that the same are for illustration purpose only and not to be taken as a definition of the invention, reference being had for the purpose to the appended claims.

What is claimed is:

1. A beam holder unit adapted to be disposed in a horizontal hollow transverse beam member to secure the said beam to an upright pillar having a plurality of spaced projections about its periphery extending in the longitudinal direction comprising a first holding member of a substantially U-shaped cross-section with one leg of the U longer than the other and provided with an apex thereon, a second holding member of substantially angular cross-section with one end thereof in the U of the first member, aligned holes in the legs of the U and the second member and screw means disposed in said aligned holes whereby the end of the long leg of the first member and the end of the corresponding member of the second member move toward or away from each other as the screw is turned in or out, the shorter leg of the first member being provided with an inwardly extending pawl and the second member being provided with a corresponding recess to engage the pawl, and the second member being provided with an apex to act as a fulcrum when the second member moves.

2. The holder unit of claim 1 wherein the long leg of the first member is provided with a recess on the outside thereof adapted to engage projections on the pillar.

3. The holder unit of claim 1 wherein the outer end of the second member is provided with a recess adapted to engage a projection of the pillar.

* * * * *